US008355359B2

(12) United States Patent
Atkinson et al.

(10) Patent No.: US 8,355,359 B2
(45) Date of Patent: Jan. 15, 2013

(54) SECONDARY PAYLOAD INTERFACE

(75) Inventors: Leonard A. Atkinson, Oak Hill, VA (US); Jonathan Howard, Sterling, VA (US); Ronald E. Huebner, Waterford, VA (US); David A. Anhalt, Centreville, VA (US); Nicholas J. Pappageorge, Herndon, VA (US); Richard A. Singer, Potomac, MD (US)

(73) Assignee: Orbital Sciences Corporation, Dulles, VA (US)

( * ) Notice: Subject to any disclaimer, the term of this patent is extended or adjusted under 35 U.S.C. 154(b) by 917 days.

(21) Appl. No.: 12/185,717

(22) Filed: Aug. 4, 2008

(65) Prior Publication Data
US 2009/0052369 A1 Feb. 26, 2009

(51) Int. Cl.
*H04B 7/185* (2006.01)
(52) U.S. Cl. ........ 370/316; 370/319; 455/12.1; 455/427
(58) Field of Classification Search .................. None
See application file for complete search history.

(56) References Cited

U.S. PATENT DOCUMENTS

| | | | |
|---|---|---|---|
| 4,384,692 A | 5/1983 | Preukschat | |
| 5,152,482 A | 10/1992 | Perkins et al. | |
| 5,251,302 A * | 10/1993 | Weigl et al. | 710/263 |
| 5,266,911 A * | 11/1993 | Perpall et al. | 333/135 |
| 5,274,839 A * | 12/1993 | Kularajah et al. | 455/12.1 |
| 5,461,349 A * | 10/1995 | Simons | 333/109 |
| 6,239,767 B1 * | 5/2001 | Rossi et al. | 343/882 |
| 6,272,345 B1 * | 8/2001 | Worger et al. | 455/436 |
| 6,301,037 B1 * | 10/2001 | Fischer et al. | 398/201 |
| 6,424,817 B1 * | 7/2002 | Hadden et al. | 455/3.02 |
| 6,491,256 B1 | 12/2002 | Wingo | |
| 6,522,265 B1 * | 2/2003 | Hillman et al. | 340/988 |
| 6,725,013 B1 | 4/2004 | Chang | |
| 6,957,078 B1 * | 10/2005 | Yousefi et al. | 455/522 |
| 6,973,051 B2 | 12/2005 | Brouet et al. | |
| 6,992,992 B1 | 1/2006 | Cooper et al. | |
| 7,036,773 B2 | 5/2006 | Caldwell | |
| 7,200,360 B1 | 4/2007 | Chang et al. | |
| 7,301,953 B1 * | 11/2007 | Norman | 370/401 |
| 7,570,949 B1 * | 8/2009 | Minerath | 455/436 |
| 7,584,493 B2 * | 9/2009 | Sibley et al. | 725/68 |
| 7,866,607 B2 * | 1/2011 | Benedict | 244/173.1 |
| 7,905,453 B2 * | 3/2011 | Benedict et al. | 244/173.3 |
| 2002/0041328 A1 * | 4/2002 | LeCompte et al. | 348/144 |
| 2002/0051465 A1 | 5/2002 | Fang et al. | |
| 2004/0106417 A1 | 6/2004 | Schieder et al. | |
| 2004/0124312 A1 | 7/2004 | Mueller et al. | |
| 2006/0174282 A1 * | 8/2006 | Dennison et al. | 725/68 |
| 2006/0192057 A1 | 8/2006 | Smith et al. | |

(Continued)

OTHER PUBLICATIONS

Chavez, T.D., et al., "Operational Satellite Concepts for ESPA Rideshare," *Aerospace Conference, IEEE*, pp. 1-7 (2007).

(Continued)

*Primary Examiner* — Robert Scheibel
(74) *Attorney, Agent, or Firm* — Ropes & Gray LLP

(57) ABSTRACT

A secondary payload interface for payload communications using a primary payload communications channel is provided. The secondary payload interface may include a plurality of input/output couplers which may connect the primary payload communications channel to a secondary payload. The plurality of input/output couplers may establish an isolated secondary payload communications channel within the primary payload communications channel. The secondary payload interface may be designed such that control and telemetry interactions with the operators of the communications satellite are limited.

36 Claims, 5 Drawing Sheets

U.S. PATENT DOCUMENTS

2007/0029446 A1* 2/2007 Mosher et al. ............. 244/158.1
2007/0264929 A1* 11/2007 Chen ............................... 455/1
2007/0296632 A1* 12/2007 Opshaug ........................ 342/450
2009/0298423 A1* 12/2009 Dankberg et al. ............. 455/12.1
2011/0074500 A1* 3/2011 Bouillet et al. ............... 329/347

OTHER PUBLICATIONS

Wegner, P.M., et al., "EELV Secondary Payload Adapter (ESPA): Providing Increased Access to Space," *Aerospace Conference, IEEE proceedings*, vol. 5, pp. 2563-2568 (2001).

* cited by examiner

SECONDARY PAYLOAD INTERFACE

BACKGROUND OF THE INVENTION

This invention relates to a secondary payload interface that allows a secondary payload to communicate using a primary payload communications channel.

Communications satellites, such as geostationary (GSO) and non-GSO satellites, are typically designed to facilitate bent-pipe transmission of communications or processed digital data traffic from one place on Earth to another. As such, the primary payload of a communications satellite provides very high communications bandwidth.

Although typically built with that single purpose in mind, these satellites may provide platforms for secondary payloads. For example, communications satellites can provide power, thermal control, and attitude control system (ACS) functions, as well as other services, to secondary payloads, such as, for example, earth-observing or weather-monitoring payloads. An auxiliary high rate communications system can be provided on the communications satellite to accommodate the secondary payload. However, other factors may make it difficult to implement such a solution. For example, while the secondary payload itself may not consume significant resources, the communications satellite may not be able to handle the size, weight, and/or power of the auxiliary communications system in addition to the secondary payload.

SUMMARY OF THE INVENTION

In accordance with the invention, a secondary payload interface for payload communications using a primary payload communications channel is provided, allowing the secondary payload to borrow a portion of the primary payload communications channel. The secondary payload interface may include a plurality of input/output couplers which may connect the primary payload communications channel to a secondary payload. The plurality of input/output couplers may include, but are not limited to, radio frequency (RF) directional couplers or power dividers, isolated baseband data ports, devoted RF ports, multiplexed shared buses with open collector interfaces, open collector transistor drivers, opto-isolated data ports, switches, filters, resistive elements, or any other type of signal interface.

In accordance with another aspect of the invention, operations of the secondary payload are kept separate from operations of the primary payload. For example, interruption of operations of the primary payload should be prevented if the secondary payload malfunctions or fails. In addition, if the secondary payload is a strategic asset that transmits and receives sensitive data, the operator of the secondary payload may want to securely control the secondary payload and secure data transmissions to and from the secondary payload.

Therefore, in order to make the sharing arrangement acceptable to operators of both the primary and secondary payloads, in some embodiments, the plurality of input/output couplers may establish an isolated secondary payload communications channel within the primary payload communications channel. For example, directional couplers may couple into a transponder path of the primary payload communications channel to establish the secondary payload communications channel. Likewise, a devoted port on a router in a primary payload (e.g., a processing payload) may be used to establish an isolated secondary payload communications channel within the primary payload communications channel.

The input/output couplers (inclusive of any interface component) may allow the secondary payload to share the communications infrastructure of the primary payload without intervention by the operations center of the communications satellite. Conversely, the input/output couplers may also ensure the reliability and continuity of the operations of the primary payload regardless of the state of the secondary payload. For example, the input/output couplers may allow the primary payload to use the rest of the primary payload communications channel while the secondary payload is communicating with a ground station. In addition, if the secondary payload is not communicating with a ground station, the input/output couplers may allow all of the primary payload communications channel to be restored to the primary payload. Thus, even if the secondary payload malfunctions and is no longer able to communicate, the primary payload may continue to communicate without interruption, with full access to the primary payload communications channel. As yet another example, if operation of the primary payload requires the full bandwidth of the primary payload communications channel, it may be possible to reserve or recapture (e.g., using or passing through the input/output couplers) the bandwidth available to or being used by the secondary payload. Use of this feature will depend on the agreement between the operators of the primary and secondary payloads. In the preferred implementation, the input/output couplers provide fault resistance of the communications services of the primary payload in the event of a failure of the secondary payload or the secondary payload interface.

In addition to isolation of the secondary payload communications channel, the secondary payload interface may include encryption and decryption modules and additional circuitry for processing data for both downlink and uplink data streams. For transmitting data, the circuitry may first receive encrypted data from the encryption module. The circuitry may then encode and modulate the encrypted data before injecting the data into the downlink data stream via the output coupler. For receiving data, the circuitry may receive data from the uplink data stream via the input coupler and demodulate and process the data before sending it to the decryption module. After the decryption module has decrypted the data, the secondary payload interface may pass the data to the secondary payload.

In some embodiments, the secondary payload interface may be designed such that control and telemetry interactions with the operators of the primary payload and/or the host satellite (which may be the same or different) are limited. For example, control interactions may be limited to power connections. As another example, telemetry interactions may be limited to discrete telemetry points that provide insight into the basic health of the secondary payload interface. As a result, the secondary payload may still be securely controlled by its operator without involvement by the operations center of the primary payload and/or the host satellite. This approach provides segregation of signals between an encrypted state and a non-encrypted state (e.g., a "red/black" interface) as required by some encryption systems.

Therefore, in accordance with the present invention, there is provided a secondary payload interface for secondary payload communications using a primary payload communications channel. This interface may include a plurality of input/output couplers for connecting the primary payload communications channel to a secondary payload, and circuitry for allowing the secondary payload to communicate with a ground station using the primary payload communications channel.

Methods for allowing communications by a secondary payload also are provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

Conventional communications satellites typically are dedicated to provide a single service. Those exceptions that carry secondary payloads have provided a dedicated, auxiliary communications system for secondary payloads. In some cases, however, it may be desirable to add a secondary payload to a communications satellite, but the satellite may not be able to accommodate an auxiliary communications system because of size, weight, and/or power constraints, even though it can accommodate the secondary payload itself.

The present invention provides a secondary payload interface for allowing secondary payload communications using the primary payload communications channel. For example, the secondary payload may be an Earth-observing sensor that needs to communicate with a ground station. The secondary payload may couple into a transponder path of the primary payload communications channel to establish a secondary payload communications channel within the primary payload communications channel.

Because coupling into the primary payload communications channel is allowed, the need for a dedicated secondary payload communications channel is avoided. A secondary payload that does not require its own dedicated communications channel may be smaller, lighter, and less costly, and will consume less power. Moreover, if the secondary payload is operated by a different entity than the operator of the communications satellite, the operator may not only charge a fee for hosting the secondary payload, but also may be able to derive additional revenue by charging fees for use of the primary payload communications channel by the secondary payload.

Figure 1:
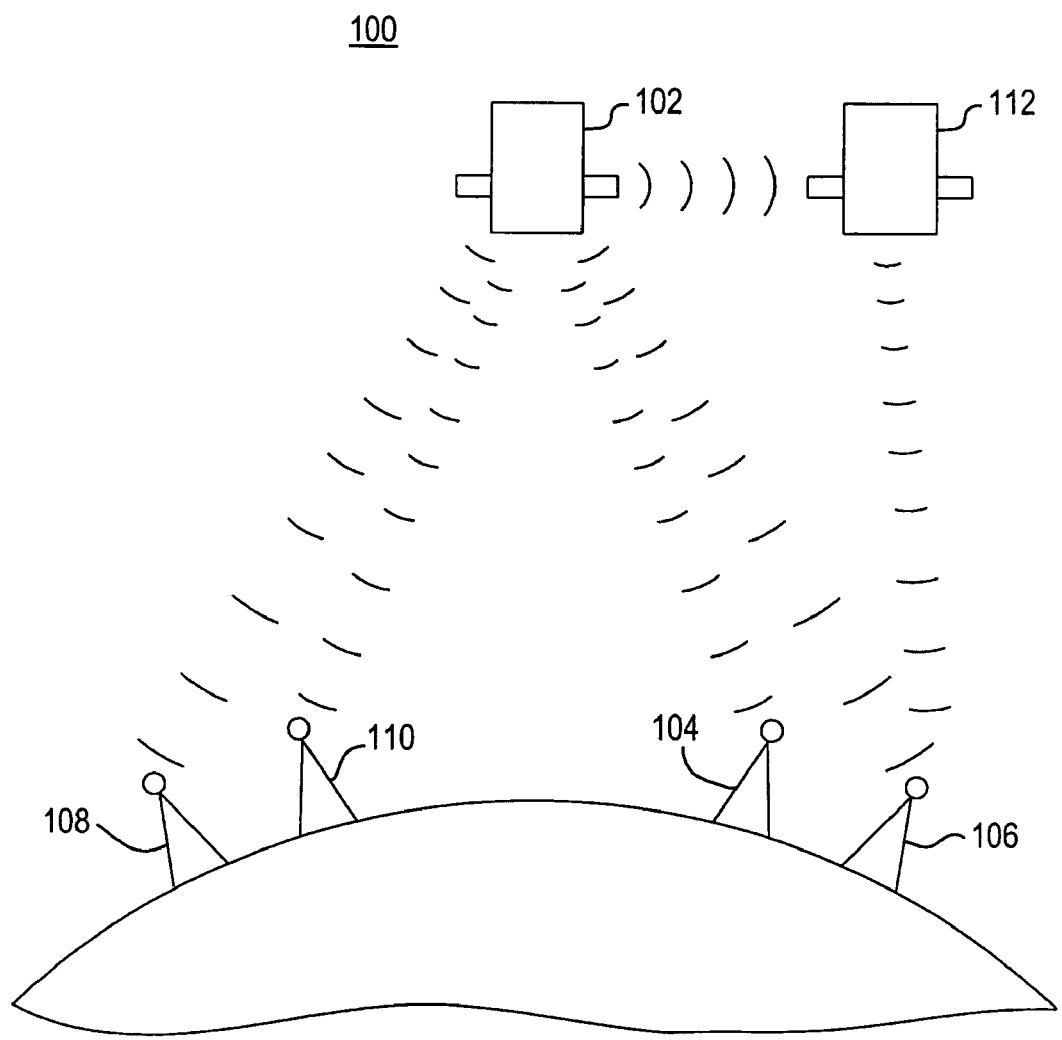
FIG. 1 is a representation of a communications system including a communications satellite and ground stations in accordance with one embodiment of the present invention.

FIG. 1 is a representation of a communications system including communications satellites and ground stations in accordance with one embodiment of the present invention. Communications system 100 may include communications satellites 102 and 112, uplink ground stations 104 and 106, and downlink ground station 108 and 110. Communications satellite 102 may host a primary payload that broadcasts a variety of data received from uplink ground station 104 or by cross-link between communications satellites 112 and 102. For example, the primary payload may provide satellite radio broadcasting of audio data received from uplink ground station 104 to downlink ground station 108 (e.g., a mobile or fixed platform receiver). As another example, the primary payload may provide television video data received from uplink ground station 104 to downlink ground station 108. Uplink ground station 104 and downlink ground station 108 may be collocated or separated depending on the mission requirement.

In addition to the primary payload, communications satellite 102 may host a secondary payload that handles data transmission to the same or a different set of ground stations (e.g., ground stations 106 and 110). For example, uplink ground station 106 may be an uplink station that transmits data (e.g., secure data) to the secondary payload on communications satellite 102. After receiving the data from uplink ground station 106, the secondary payload may transmit the data to downlink ground station 110 for loop-back verification of the command signaling. As in the case of the uplink and downlink ground stations of the primary payload, uplink ground station 106 and downlink ground station 110 may be collocated or separated. In some cases, the secondary payload may share the uplink and downlink ground stations of the primary payload, and then filter and stream its data to another location for further processing.

Figure 2:
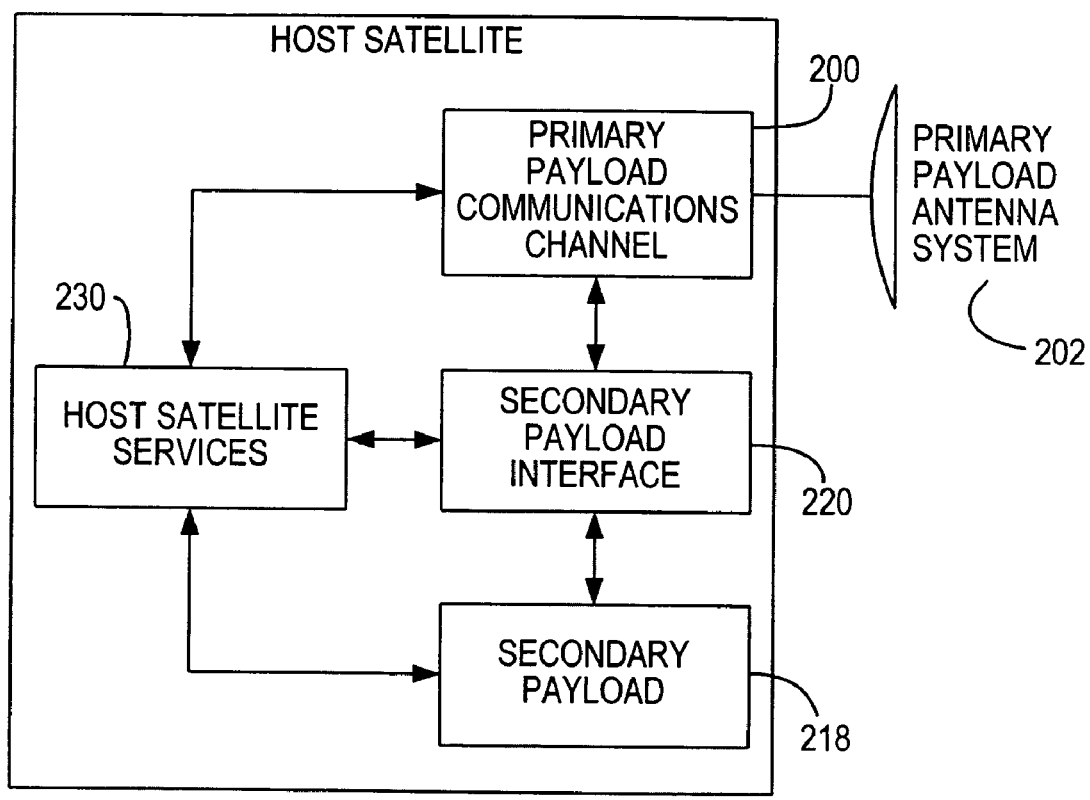
FIG. 2 is a general block diagram of an embodiment of a secondary payload that utilizes the primary payload communications channel and the services of the host satellite in accordance with one embodiment of the present invention.
Figure 3:
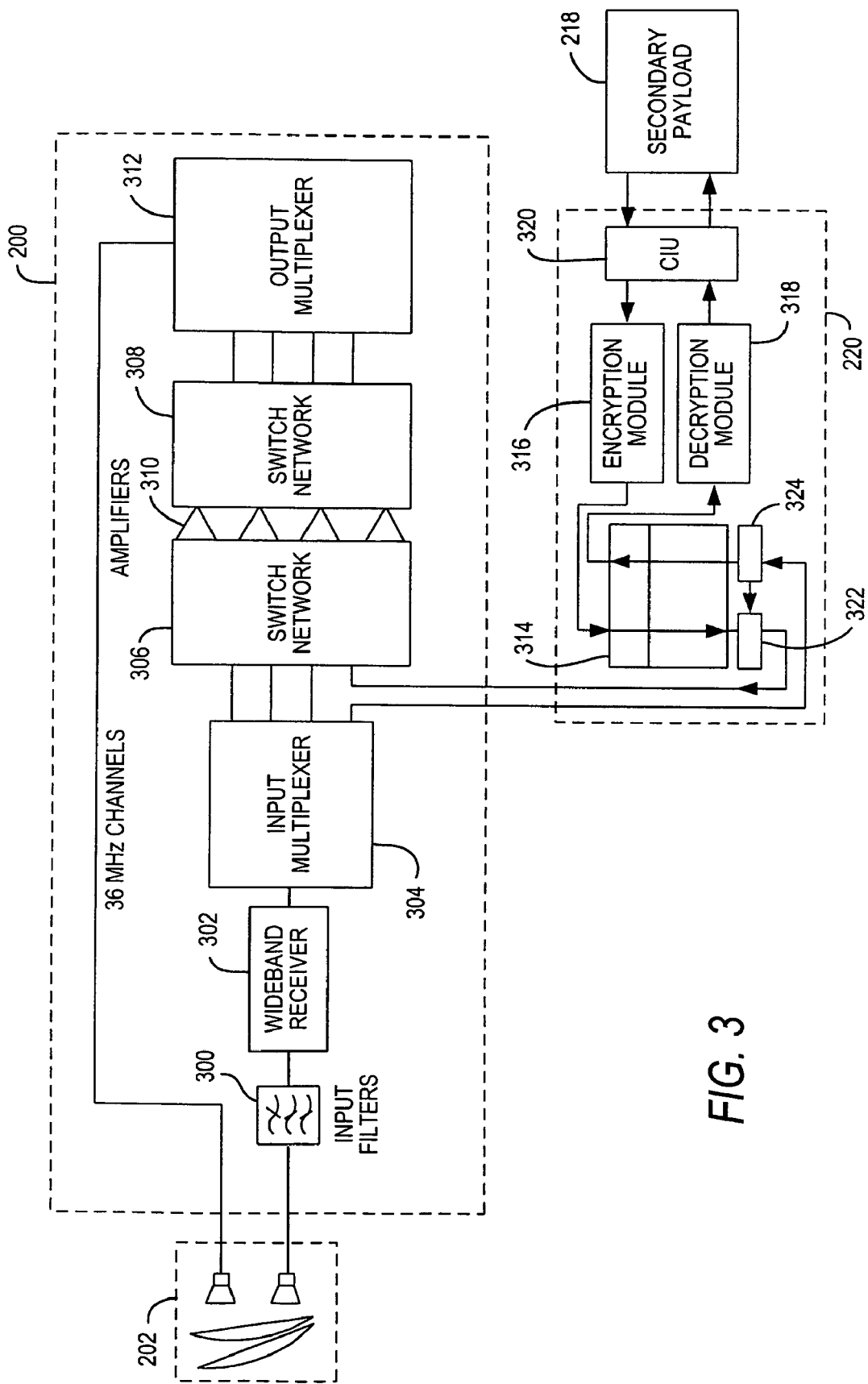
FIG. 3 is a block diagram of an embodiment of the primary payload communications channel of a communications satellite, coupled with a secondary payload interface in accordance with one embodiment of the present invention.

FIGS. 2 and 3 are block diagrams of an embodiment of the primary payload communications channel of communications satellite 102, coupled with a secondary payload interface in accordance with one embodiment of the present invention. Primary payload communications channel 200 may include primary payload antenna system 202. In some embodiments, primary payload antenna system 202 may include a reflector, which reflects and/or collects electromagnetic waves transmitted in either direction between the communications satellite and ground stations.

The electromagnetic waves received at primary payload antenna system 202 may be filtered by input filters 300 before being sent to wideband receiver 302. Primary payload communications channel 200 may then send the data to input multiplexer 304, which may allow the data to be distributed to payloads on the communications satellite through various transponder paths. A transponder may include one, and, in some cases, multiple channels as a result of data compression and multiplexing. Any frequency band may be used in primary payload communications system 200.

Primary payload communications channel 200 may transmit data by feeding the data to a high power amplifier redundancy switching component of primary communications channel 200, which may include switch networks 306 and 308 and amplifier 310. For example, the data can be fed to amplifiers 310 through switch network 210. Amplifiers 310 may include any suitable high-power amplifiers, such as, for example, traveling wave tubes or solid-state power amplifiers. The output of amplifiers 310 may then be applied to output multiplexer 312 through switch network 308 for transmission to primary payload antenna system 202. 36 MHz bandwidth channels, which are available on many commercial satellites, may be provided for the downlink channels. After data has been received at primary payload antenna system 202, the antenna system may transmit the data to the ground station.

Secondary payload 218 may be coupled to primary payload communications channel 200 through secondary payload interface 220 (see FIG. 2). Secondary payload interface 220 may couple into the transponder path between input multiplexer 304 and switch network 306. Secondary payload interface 220 may include any suitable number of ports (e.g., one or more ports). By coupling into the transponder path, secondary payload interface 220 may establish a secondary payload communications channel within the existing primary payload communications channel of the communications satellite. The secondary payload communications channel may allow the transmission of high-bandwidth data from secondary payload 218 to a ground station using the primary payload communications channel (e.g., a commercial C-Band communications channel).

The primary components of secondary payload interface 220 may include circuitry 314, encryption module 316, decryption module 318, payload/crypto interface unit (CIU) module 320, and input/output couplers 322 and 324. Optional encryption module 316, decryption module 318, and CIU module 320 may be integrated in secondary payload interface 220 at any suitable point depending on the security requirements of the secondary payload. For example, encryption module 316, decryption module 318, and CIU module 320 may be incorporated within circuitry 314. As another example, shown in FIG. 3, encryption module 316, decryption module 318, and CIU module 320 may be integrated-in-line between circuitry 314 and secondary payload 218. Once a secondary payload communications channel has been established, encryption module 316, decryption module 318, and CIU module 320 may allow the operator of secondary payload 218 to control secondary payload 218 and protect the data without intervention or involvement from the operations center of the communications satellite.

Figure 4:
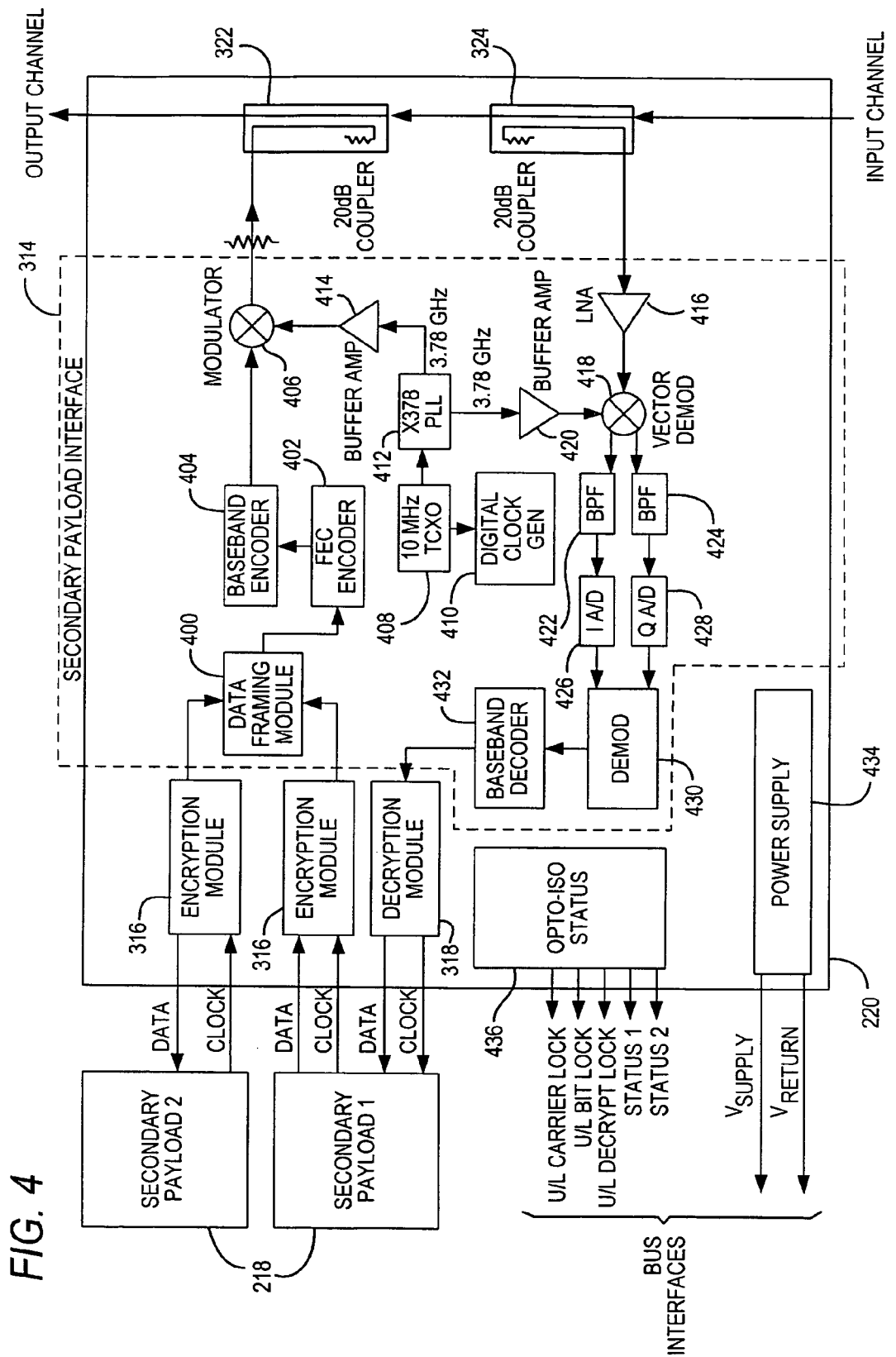
FIG. 4 is a block diagram of an exemplary secondary payload interface in accordance with one embodiment of the present invention.

Referring now to FIG. 4, a block diagram of an exemplary secondary payload interface in accordance with one embodiment of the present invention is shown. Secondary payload interface 220 may serve as an interface for multiple secondary payloads (e.g., secondary payloads 218). It will be understood that although two secondary payloads are shown in FIG. 2 to be coupled to secondary payload interface 220, any number of secondary payloads, from one up to a maximum number determined by other constraints (e.g., such as space, launch weight, and available power) may be coupled.

In the downlink transmission stream, secondary payloads 218 may transmit data and clock signals to secondary payload interface 220. These data and clock signals can be either single-ended signals or differential signals (e.g., low-voltage differential signals (LVDS)). In some embodiments, secondary payload interface 220 may include an encryption module (e.g., encryption module 316), which may be capable of supporting a variety of data rates. For example, differential data may be encrypted by running the data at high speeds over a high bandwidth LVDS system to encryption module 316 (e.g., NSA certified Type 1 COMSEC MEU-121). In addition, single-ended data may be encrypted by running the data over a single-ended system to encryption module 316. Depending on the security requirements of the secondary payloads, each secondary payload may have its own encryption module or multiple secondary payloads may share a single encryption module. In some embodiments, a CIU module (e.g., CIU module 320 of FIG. 3) may be used to interface with any required cryptographic equipment for the secondary payload (e.g., to provide "red-side" control and status).

After the data has been encrypted by encryption module 316, secondary payload interface may send the data to circuitry 314 (e.g., a secondary payload interface modem). Circuitry 314 may then frame, perform Forward Error Correction (FEC) and baseband encoding, and finally modulate the data onto the carrier signal using a format compatible with the primary payload communications channel. For example, data framing module 400 may encode bits of data into data packets. In some embodiments, data framing module 400 may add transmission protocol knowledge and management information associated with the primary payload communications channel.

After data has been framed into data packets, FEC encoder 402 may encode the data packets using forward error correction (FEC). Thus, errors that are introduced during data transmission may be corrected.

FEC of the data packets aids in improving throughput and reducing the required transmission power of the communications satellite. As a result, the overall demand on the power system of the communications satellite is decreased. Alternatively, the bit rate may be increased while holding the same power level and link margin. Any suitable form of FEC may be used to improve the system throughput and reduce power consumption, such as, for example, block coding, convolutional coding, concatenated coding, and turbo coding schemes.

The data packets are then sent to baseband encoder 404. Baseband encoder 404 may perform any final processing or formatting of the data packets prior to modulation. For example, baseband encoder 404 may convert the data packets from non-return-to-zero (NRZ) to NRZ-Mark (NRZ-M) for binary phase-shift keying (BPSK) and quadrature phase-shift keying (QPSK) ambiguity resolution. As another example, baseband encoder 404 may include a commutator for offset QPSK.

After the appropriate baseband encoding has been performed on the data packets, circuitry 314 may send the encoded data packets to modulator 406. Modulator 406 may modulate the encoded data packets onto a carrier signal using any suitable means of information modulation (e.g., analog or digital) such as, for example, amplitude modulation (AM), frequency modulation (FM), frequency-shift keying (FSK), phase modulation (PM), phase-shift keying (PSK), QPSK, quadrature amplitude modulation (QAM), ultra-wideband (UWB), or code division multiple access (CDMA).

QAM is a modulation scheme which conveys data by modulating the amplitude and phase of the in-phase (I) and quadrature (Q) components of a carrier signal. 16-symbol QAM includes 16 constellation points represented on the I-Q plane, where each constellation point contains 4 bits of information, resulting in a bit-rate spectral density of 4 bps/Hz. Because each symbol is represented as a complex number, modulator 406 may convey the encoded data by modulating the amplitude and phase of two carrier sinusoidal waves (which are 90° out of phase) with the real (I) and imaginary (Q) parts of each symbol. Modulator 406 may then send the symbol with the two carriers on the same frequency. This approach is desirable because data is easily transmitted as two pulse amplitude modulation (PAM) signals on quadrature carriers, and, thus, can be easily demodulated.

Using the 36 MHz (see FIG. 3) bandwidth channels provided by the primary payload communications channel, downlink data rates of up to 144 Mbps (Nyquist limit) may be achieved with 16-QAM. In addition, the 36 MHz bandwidth channels may support downlink data rates of up to 72 Mbps with QPSK modulation. Likewise, the 36 MHz bandwidth channels may support downlink data rates of up to 108 Mbps with 8PSK modulation.

Temperature compensated crystal oscillator (TCXO) 408 may provide secondary payload interface 220 with a precise frequency standard that supports a highly stable clock signal for a digital integrated circuit. Thus, TCXO 408 may serve as a digital clock generator. It will be understood that TCXO 408 may provide any reference frequency required by the communications satellite for stability and phase noise. For example, as shown in FIG. 4, TCXO 408 may be set at 10 MHz.

In some embodiments, TCXO 408 may assist with stabilizing the frequencies for the 16-symbol QAM of modulator 406. For example, the reference frequency provided by TCXO 408 may be sent to phase locked loop (PLL) 410, which can generate local oscillator frequencies that are much higher than the reference frequency. In the example shown in FIG. 4, PLL 410 may generate stable 3.78 GHz local oscillator frequencies from the frequency reference provided by 10 MHz TCXO 408. The 3.78 GHz local oscillator frequencies may then be sent to buffer amplifier 412 before being transmitted to modulator 406 for frequency stabilization. PLL 410 may derive the local oscillator frequencies using any suitable approach, such as, for example, by frequency multiplication, directly by oscillators, by a numerically controlled oscillator, or by another means specified by the primary payload communications channel.

Secondary payload interface 220 may include any suitable number of input/output couplers for connecting the primary payload communications channel to secondary payload 218. For example, as shown in FIG. 4, input/output couplers 322 and 324 may be directional couplers that couple in and out of the transponder path of the primary payload communications channel to establish a secondary payload communications channel within the communications channel. By coupling into the primary payload communications channel and using the existing communications infrastructure, the need for a devoted secondary payload communications channel is avoided.

In some embodiments, the secondary payload communications channel may be isolated from the rest of the primary payload communications channel. As a result, the isolated secondary payload communications channel may allow an operator to securely control secondary payload 218 via the secondary payload communications channel. In the example shown in FIG. 3, secondary payload interface 220 utilizes loose (e.g., −20 dB) input/output couplers 322 and 324 to achieve integration and isolation of the secondary payload communications channel. Persons skilled in the art will appreciate that any highly reliable implementations of input/output couplers may be used, such as, for example, highly reliable switches (e.g., solid-state, electromechanical, or other RF or IF switches), circulators for radio frequency/intermediate frequency (RF/IF) coupling, or open collector or highly reliable tri-state devices or devoted ports for baseband signal coupling.

Input/output couplers 322 and 324 includes metallic conductors and dielectrics and preferably are intrinsically immune to radiation induced degradation (e.g., they are considered "rad hard"). Thus, input/output couplers 322 and 324 may be expected to operate reliably in the harsh radiation environments of geosynchronous satellites. Conversely, electronic switches (e.g., mechanical switch matrices and pin diodes) can be vulnerable to radiation induced effects such as single-event effects, single event latchups, and total ionizing dose effects and/or mechanical failure due to contamination or breakage. Such degradation may compromise or catastrophically degrade the performance of these electronic switches and, as a result, may compromise the viability of the primary payload communications channel and payload missions for both the primary and secondary payloads. Furthermore, electronic switches are also unreliable because the switches may fail to either open or close. In some cases, the electronic switches may even operate in indeterminate states (both closed or both open). Input/output couplers 322 and 324, however, include no moving parts or mechanical switches, and therefore operate more reliably.

Figure 5:
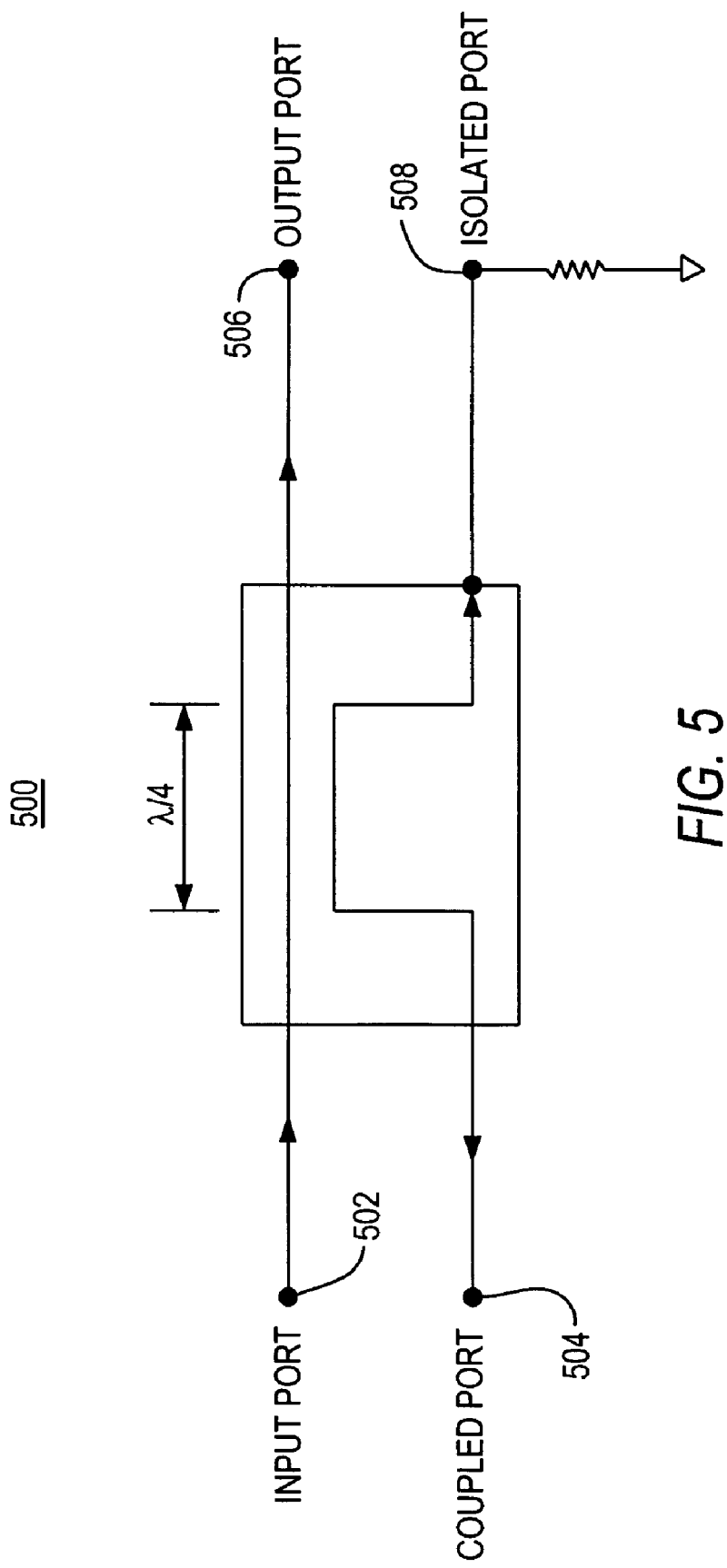
FIG. 5 is a schematic representation of a directional coupler in accordance with one embodiment of the present invention.

FIG. 5 shows how a coupler may appropriately configure two adjacent transmission lines to achieve isolation. The characteristics of coupler 500 may be determined by its geometrical and/or structural configuration. Coupler 500 separates signals based on the direction of signal propagation. For example, some portion of signal flowing into input port 502 appears at coupled port 504. Similarly, some portion of signal flowing into coupled port 504 is fully coupled to input port 502. However, coupled port 504 and output port 506 are isolated such that any signal flowing into output port 506 will not appear at coupled port 504 but will be fully coupled to input port 502. In the configuration shown in FIG. 5, isolated port 508 is terminated with a matched load.

Referring back to FIG. 4, the functionality of couplers for isolating the secondary payload communications channel will now be discussed. On the downlink side, a portion of the power for the data packets that are being transmitted to output coupler 322 (e.g., coupled port 504 of FIG. 5) will appear at the output channel (e.g., input port 502 of FIG. 5). In particular, because in this example output coupler 322 has a coupling loss of −20 dB, 1% of the input power will appear at the output channel. Data being fed into output coupler 322 (e.g., output port 506 of FIG. 5), however, will be isolated from circuitry 314. Similarly, on the uplink side, a portion of the power for the data received from the input channel of input coupler 324 (e.g., input port 502) will appear at circuitry 314 (e.g., coupled port 504). However, the coupled port of input coupler 324 will be isolated from the output port. The combination of input/output couplers 322 and 324 creates an isolated secondary payload communications channel. In addition, the output is isolated from the input which reduces self-interference to the uplink from the downlink. The ability to isolate control of and output from secondary payloads 218 from the operators of the primary payload may be important, especially if the secondary payloads are strategic assets.

In addition, because this coupling implementation has no net reliability impact on the communications services of the primary payload, this implementation represents a robust approach to ensuring reliability and continuity of the mission of the primary payload. For example, the loose coupling enables the primary payload to use the rest of the primary payload communications channel (e.g., any bandwidth not utilized by secondary payload 218) while secondary payload 218 is communicating with the ground station. Thus, if the secondary payload only utilizes a fraction of the primary payload communications channel with its uplink and downlink, the remainder of the channel may be utilized by a primary service end user. As another example, the loose coupling of input/output couplers 322 and 324 may enable the primary payload to use all of the primary payload communications channel when secondary payload 218 is not communicating with the ground station (e.g., the lack of communication may be due to either planned termination or unplanned malfunction or failure). Thus, when secondary payload interface 220 is powered off, normal traffic may resume in the transponder path of the primary payload communications channel, and full capacity may be returned to the primary payload. As yet another example, in response to determining that the primary payload requires additional bandwidth that is currently being used by or available to secondary payloads 218, secondary payload interface 220 (e.g., using input/output couplers 322 and 324) may disable communications of the secondary payloads to reserve or recapture the full bandwidth of the primary communications channel. Use of this feature will depend on the agreements between the operators of the primary and secondary payloads, but the feature may be technically supported.

Referring now to the uplink stream, after data has been received from the secondary payload communications channel via input coupler 324, circuitry 314 may demodulate, process, and decode the coupled signal. Because in this example input coupler 324 has a coupling loss of −20 dB, a very small portion of the input power (1%) will appear at circuitry 314. Thus, low-noise amplifier (LNA) 414 in circuitry 314 may be used to amplify the power of the received data. LNA 414 is an active component that is capable of boosting the power while adding as little noise and distortion as possible. In addition, LNA 414 will not damage the transponder path of the primary payload communications channel.

The amplified signal will then be fed to vector demodulator 416. For generalized I/Q de-modulation, vector demodulator 416 may multiply the signal with orthogonal signal components (e.g. sine and cosine) to produce two baseband signals (e.g., I(t) and Q(t)). Because frequency variations due to temperature or aging may be introduced in the frequency translation process, a stable oscillator is desired. This reference may be provided by the stable 3.78 GHz local oscillator frequencies received from PLL 410 and amplified by buffer amplifier 418.

Circuitry 314 may then send both I(t) and Q(t) to band-pass filter (BPF) 420 and BPF 422. BPFs 420 and 422 may then process I(t) and Q(t) such that frequency terms outside of a certain frequency range are removed and components that are in phase (or in quadrature) are extracted. After I(t) and Q(t) have been filtered, I(t) may be passed through analog to digital (A/D) converter 424, and Q(t) may be passed through A/D converter 426. Finally, I(t) and Q(t) may be merged and demodulated by demodulator 428. Demodulator 428 may use any suitable demodulation scheme complementary to the modulation scheme used by modulator 406, such as, for example, QPSK, QAM, PSK, etc. Circuitry 314 may then send the demodulated data to baseband decoder 430, which can perform the opposite operation of baseband encoder 404.

Decryption module 318 (e.g., a MCU-110 decryptor) may receive the decoded data, and perform decryption so that the data can be routed to secondary payload 218. If uplink data rates are approximately at 1 Mbps, an RS-422 bus (shown in FIG. 3) may provide the interface between decryption module 318 and secondary payload 218. Similar to encryption module 316, persons skilled in the art will appreciate that, depending on the security requirements of the secondary payloads, each secondary payload may have its own decryption module or multiple secondary payloads may share a single decryption module.

In some embodiments, secondary payload interface 220 may be designed such that control and telemetry interactions with the operators of the communications satellite are limited (e.g., host satellite services 230 of FIG. 2). For example, control interactions with the communications satellite may be limited to connections that provide power to secondary payload interface 220. As shown in FIG. 4, the Vsupply connection enables power to be provided to power supply 432. In addition, the Vreturn may provide a power control signal for the communications satellite. As another example, telemetry interactions with the communications satellite may be limited to discrete telemetry points that provide insight into the basic health of secondary payload interface 220. Suitable telemetry points may include but are not limited to, for example, carrier lock (e.g., U/L carrier lock), bit lock (e.g., U/L bit lock), decrypt lock (e.g., U/L decrypt lock), temperature, heartbeat, and frame lock. Opto-isolator status module 434 may provide these telemetry points to communications satellite.

The bandwidth requirements for continuous control and telemetry interactions between secondary payload interface 220 and the communications satellite may vary depending on the required data rate. For example, for a data rate of 2.0 Mbps, the bandwidth requirement is dependent on the bit-rate spectral density of the implemented modulation schema. A portion of the channel bandwidth provided by the primary payload communications channel may thus be used to support the uplink channels. As a result of this design, although some of the operations of secondary payloads 218 (e.g., control and telemetry interactions) are connected to the communications services of the communications satellite, the secondary payload may still be securely controlled by the operator of the secondary payload without involvement by the operations center of the communications satellite. Persons skilled in the art will appreciate that secondary payload interface 220 may be expanded into any payload-to-communications systems interface where the secondary payload may utilize a fraction or all of a communications channel shared by other services.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A secondary payload interface for secondary payload communications using a primary payload communications channel for a primary payload of a communications satellite configured to communicate data to and from a ground location, the secondary payload interface comprising:
   a plurality of input/output couplers for connecting the secondary payload to the primary payload communications channel for the primary payload of the communications satellite;
   wherein the primary payload of the communications satellite performs a first service associated with the communications satellite, and communicates data for the first service from the primary payload to a first ground station using the primary payload communications channel, and wherein the secondary payload provides a second service, the second service different from the first service;
   circuitry for allowing the secondary payload to communicate with the ground station or a second ground station using the primary payload communications channel; and
   wherein the plurality of input/output couplers allow some or all of the primary payload communications channel to be restored to the primary payload when the secondary payload is not communicating with the ground station.

2. The secondary payload interface of claim 1, wherein the secondary payload is hosted on the communications satellite.

3. The secondary payload interface of claim 1, wherein the plurality of input/output couplers establish a secondary payload communications channel within the primary payload communications channel, wherein the secondary payload communications channel is isolated from the rest of the primary payload communications channel.

4. The secondary payload interface of claim 1, wherein the plurality of input/output couplers are directional couplers.

5. The secondary payload interface of claim 1, wherein the plurality of input/output couplers are open collector transistor drivers.

6. The secondary payload interface of claim 1, wherein the plurality of input/output couplers are solid-state switches.

7. The secondary payload interface of claim 1, wherein the plurality of input/output couplers are electro-mechanical switches.

8. The secondary payload interface of claim 1, wherein the plurality of input/output couplers are RF switches.

9. The secondary payload interface of claim 1, wherein the plurality of input/output couplers are IF switches.

10. The secondary payload interface of claim 1, wherein the plurality of input/output couplers are baseband data ports.

11. The secondary payload interface of claim 1, wherein the plurality of input/output couplers are power dividers.

12. The secondary payload interface of claim 1, wherein the plurality of input/output couplers are opto-isolated data ports.

13. The secondary payload interface of claim 1, wherein the plurality of input/output couplers are filters.

14. The secondary payload interface of claim 1, wherein the plurality of input/output couplers are resistive elements.

15. The secondary payload interface of claim 1, wherein the plurality of input/output couplers are radio frequency ports.

16. The secondary payload interface of claim 1, wherein the circuitry comprises an encryption module for:
    receiving data from the secondary payload; and
    encrypting the data.

17. The secondary payload interface of claim 16, wherein the circuitry comprises a data framing module for framing bits of the data into data packets.

18. The secondary payload interface of claim 17, wherein the circuitry comprises a modulator for modulating the data packets into a format suitable for the primary payload communications channel.

19. The secondary payload interface of claim 18, wherein the format comprises quadrature-amplitude modulation signals.

20. The secondary payload interface of claim 1, wherein the plurality of input/output couplers enable the primary payload to use the rest of the primary payload communications channel while the secondary payload is communicating with the ground station.

21. The secondary payload interface of claim 1, wherein the plurality of input/output couplers further allow all of the primary payload communications channel to be restored to the primary payload regardless of the operational state of the secondary payload.

22. A method for payload communications using a primary payload communications channel for a primary payload of a communications satellite configured to communicate data to and from a ground location, the method comprising:
    coupling into a transponder path of the primary payload communications channel to establish a secondary payload communications channel within the primary payload communications channel for the primary payload of the communications satellite;
    wherein the primary payload of the communications satellite performs a first service associated with the communications satellite, and communicates data for the first service from the primary payload to a first ground station using the primary payload communications channel, and wherein the secondary payload provides a second service, the second service different from the first service;
    allowing a secondary payload to communicate with the ground station or a second ground station using the secondary payload communications channel; and
    allowing some or all of the primary payload communications channel to be restored to the primary payload when the secondary payload is not communicating with the ground station.

23. The method of claim 22, wherein the secondary payload is hosted on the communications satellite.

24. The method of claim 22, wherein the secondary payload communications channel is isolated from the rest of the primary payload communications channel.

25. The method of claim 22, wherein the coupling comprises:
    coupling into the transponder path of the primary payload communications channel using a plurality of directional couplers.

26. The method of claim 22, wherein the coupling comprises:
    coupling into the transponder path of the primary payload communications channel using open collector transistor drivers.

27. The method of claim 22, wherein the coupling comprises:
    coupling into the transponder path of the primary payload communications channel using solid-state switches.

28. The method of claim 22, wherein the coupling comprises:
    coupling into the transponder path of the primary payload communications channel using electromechanical switches.

29. The method of claim 22, wherein the coupling comprises:
    coupling into the transponder path of the primary payload communications channel using RF switches.

30. The method of claim 22, wherein the coupling comprises:
    coupling into the transponder path of the primary payload communications channel using IF switches.

31. The method of claim 22, wherein the allowing comprises:
    receiving data from the secondary payload;
    modulating the data into a format suitable for the primary payload communications channel; and
    transmitting the modulated data to the ground station.

32. The method of claim 21, wherein the allowing comprises:
    receiving data from the ground station;
    demodulating the data; and
    transmitting the demodulated data to the secondary payload.

33. The method of claim 22, further comprising:
    disabling communications of the secondary payload to recapture all of the primary payload communications channel to a primary payload.

34. A method for controlling at least one secondary payload hosted on a communications satellite configured to communicate data to and from a ground location, the method comprising:
    isolating a secondary payload communications channel within a primary payload communications channel for a primary payload on the communications satellite using a secondary payload interface, wherein the secondary payload interface comprises a plurality of directional couplers that isolate the secondary payload communications channel, and wherein the primary payload on the communications satellite performs a first service associated with the communications satellite, and communicates data for the first service from the primary payload to a first ground station using the primary payload communications channel, and wherein the secondary payload provides a second service, the second service different from the first service;

securely controlling the at least one secondary payload via the isolated secondary payload communications channel; and allowing some or all of the primary payload communications channel to be restored to the primary payload when the secondary payload is not communicating with the ground station.

35. The method of claim 34, further comprising:
limiting control interactions with the communications satellite to connections that provide power to the secondary payload interface.

36. The method of claim 34, further comprising:
limiting telemetry interactions with the communications satellite to discrete telemetry points that comprise at least one of carrier lock, temperature, heartbeat, and frame lock.

* * * * *